(12) United States Patent
Takaba et al.

(10) Patent No.: US 9,388,879 B2
(45) Date of Patent: Jul. 12, 2016

(54) POWER TRANSMISSION BELT AND METHOD OF FORMING A POWER TRANSMISSION BELT

(75) Inventors: Susumu Takaba, Hyogo (JP); Yorifumi Hineno, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 1179 days.

(21) Appl. No.: 11/315,637

(22) Filed: Dec. 22, 2005

(65) Prior Publication Data

US 2006/0154770 A1 Jul. 13, 2006

(30) Foreign Application Priority Data

Dec. 27, 2004 (JP) ................... 2004-375321
Mar. 22, 2005 (JP) ................... 2005-081834
Sep. 29, 2005 (JP) ................... 2005-284984
Oct. 19, 2005 (JP) ................... 2005-304227

(51) Int. Cl.
*F16G 1/00* (2006.01)
*F16G 5/20* (2006.01)

(52) U.S. Cl.
CPC ........................................ *F16G 5/20* (2013.01)

(58) Field of Classification Search
CPC ........................................................ F16G 5/06
USPC ................... 474/260, 263; 524/397; 264/108
See application file for complete search history.

(56) References Cited

U.S. PATENT DOCUMENTS

| | | | | |
|---|---|---|---|---|
| 3,404,578 A | * | 10/1968 | Fritz Koch et al. | ........... 474/263 |
| 3,469,297 A | * | 9/1969 | Webber | .............. B01D 39/2041 |
| | | | | 29/419.1 |
| 4,389,361 A | * | 6/1983 | Messerly | ..................... 264/108 |
| 4,775,357 A | * | 10/1988 | Wolfe | ........................ 474/205 |
| 4,798,566 A | * | 1/1989 | Sedlacek | ....................... 474/238 |
| 5,495,935 A | * | 3/1996 | Zabron et al. | .................. 198/847 |
| 5,495,945 A | * | 3/1996 | Apps et al. | ..................... 206/519 |
| 5,610,217 A | * | 3/1997 | Yarnell et al. | ................. 524/397 |
| 5,904,630 A | * | 5/1999 | Berthelier | ..................... 474/263 |
| 5,958,794 A | * | 9/1999 | Bruxvoort | .............. B24B 7/228 |
| | | | | 216/88 |
| 5,971,879 A | * | 10/1999 | Westhoff | ...................... 474/260 |
| 6,063,332 A | * | 5/2000 | Imamura et al. | .................. 419/4 |
| 6,383,432 B1 | * | 5/2002 | Nakajima et al. | .......... 264/210.7 |
| 6,432,013 B1 | * | 8/2002 | Tani et al. | ...................... 474/263 |
| 6,435,997 B1 | * | 8/2002 | Kurose et al. | ................. 474/263 |
| 6,482,118 B1 | * | 11/2002 | Watanabe et al. | ............ 474/263 |
| 6,605,014 B2 | * | 8/2003 | Isshiki et al. | .................. 474/263 |
| 2002/0072445 A1 | * | 6/2002 | Daugherty et al. | ........... 474/253 |
| 2004/0033857 A1 | * | 2/2004 | Welk et al. | ..................... 474/263 |
| 2004/0155375 A1 | * | 8/2004 | Patterson et al. | ............. 264/159 |
| 2004/0214676 A1 | * | 10/2004 | Shiriike et al. | ................ 474/260 |
| 2005/0003918 A1 | | 1/2005 | Hayashi | |

FOREIGN PATENT DOCUMENTS

AT 268791 B 2/1969

OTHER PUBLICATIONS

Office Action issued Oct. 30, 2015, in German Patent Application No. 10 2005 062 082.5.

* cited by examiner

*Primary Examiner* — Robert A Siconolfi
*Assistant Examiner* — Mahbubur Rashid
(74) *Attorney, Agent, or Firm* — Wood, Phillips, Katz, Clark & Mortimer

(57) ABSTRACT

A power transmission belt having a body with a length, an inside, an outside, laterally spaced sides, and a plurality of ribs extending lengthwise at one of the inside and outside of the body. The body has a rubber layer at the other of the inside and outside of the body in which non-straight, short fibers are embedded.

47 Claims, 3 Drawing Sheets

POWER TRANSMISSION BELT AND METHOD OF FORMING A POWER TRANSMISSION BELT

BACKGROUND OF THE INVENTION

1. Field of the Invention

This invention relates to power transmission belts and, more particularly, to a power transmission belt that may have a plurality of ribs extending lengthwise of a body on the belt. The invention is further directed to a method of forming such a power transmission belt.

2. Background Art

V-ribbed power transmission belts are used in many different environments. Typically, a V-ribbed belt has a compression section, in which a plurality of ribs are formed that extend in a lengthwise direction with respect to the belt body. A cushion rubber layer is applied to the compression section and has at least one load carrying member/cord embedded therein. To the cushion rubber layer, a layer, typically of canvas, is applied so as to be exposed on the belt body. The canvas layer increases the lengthwise crack resistance of the belt body. Typically, the canvas layer is made by rubber coating a flat fabric having woven warp and weft components.

In one application, a V-ribbed belt is trained around a driving pulley and a driven pulley with an inside of the belt engaged to drive/be driven by associated pulleys. The outside of the belt is engaged by an idler pulley. The interaction of the idler pulley and belt tends to generate unwanted noise. This noise generation may occur as the idler pulley contacts a seam where the ends of the canvas layer are joined. Noise generation may occur at other than this seam location. One of the causes for this latter type of noise generation results from the surface configuration for the canvas layer that contacts the idler pulley.

During formation of a bias canvas or cylindrical canvas, and/or during fitting of a cylindrical canvas onto a belt forming structure, the canvas mechanically deforms, as a result of which the crossing angles of warp and weft, and the size of the surrounding meshes, may vary. This irregularity results in local concentrations of the warp and weft components. As the idler pulley engages the areas having different surface characteristics, noise may be generated.

One way to avoid the above condition is to eliminate the canvas layer, whereby a rubber component becomes directly exposed to engage the idler pulley. However, with this construction adhesive wear is likely to occur, which may generate another type of noise, such as a slip sound in operation.

To avoid this latter condition, short fibers may be mixed into the exposed rubber layer that engages the idler pulley. Such a construction is shown in U.S. Patent Application Publication No. US2005/0003918 (Hiyashi). Hiyashi teaches to control the orientation of the short fibers in the exposed rubber layer so as to avoid noise generation.

With Hiyashi's construction, there is a danger that the belt body may be prone to splitting lengthwise in trough regions between adjacent ribs. Alternatively, cracks may be generated in the belt width direction at an end portion of the belt body from at this surface. This type of belt is particularly prone to a lengthwise split or cracking in the event that ethylene/α-olefin is used as the elastomer to define the belt body. In the event a peroxide cross link material is used, the likelihood of tearing is even further increased.

To avoid lengthwise splitting in the trough region between adjacent teeth, the lengths of the short fibers may be aligned to extend laterally between the sides of the belt body. Alternatively, to reduce the likelihood of crack generation, the short fibers may be oriented so that their lengths align generally with the length of the belt body. Generally, designers using the short fibers for purposes of reinforcement have been required to focus on either avoiding lengthwise cracking or cracking at an end portion. It is difficult, using the construction as in Hiyashi, to effectively address both the problems of lengthwise splitting and cracking of an end portion of the belt body.

SUMMARY OF THE INVENTION

In one form, the invention is directed to a power transmission belt having a body with a length, an inside, an outside, laterally spaced sides, and a plurality of ribs extending lengthwise at one of the inside and outside of the body. The body has a rubber layer at the other of the inside and outside of the body in which non-straight, short fibers are embedded.

The body may include at least one load carrying member extending lengthwise of the body between the inside and outside thereof.

The mass ratio of non-straight, short fibers to rubber in the rubber layer may be in a range of 4:100 to 35:100.

The non-straight, short fibers may be randomly oriented in the rubber layer.

The non-straight, short fibers may be milled fibers.

In one form, the non-straight, short fibers may be polyamide.

The rubber in the rubber layer may have ethylene/α-olefin as a main component.

In one form, the ethylene/α-olefin consists of an ethylene-propylene-diene copolymer and an ethylene-butene copolymer.

The mass ratio of ethylene-propylene-diene copolymer to ethylene-butene copolymer may be in a range of from 90:10 to 30:80.

The rubber layer may further include a plurality of ultra-short fibers having a length in a range of from 0.1 mm to 1.0 mm.

The ultra-short fibers may be made from cellulose.

The rubber layer may be directly exposed at the other of the inside and outside of the body.

In one form, the power transmission belt has a compression section and a tension section and the plurality of ribs is defined in the compression section and the rubber layer is in the tension section.

The non-straight, short fibers may have a length of 0.1 to 3.0 mm.

The invention is further directed to a power transmission belt having a body with a length, an inside, an outside and laterally spaced sides. The body has a rubber layer at one of the inside and outside of the body in which non-straight, short fibers are embedded.

The body may include at least one load carrying member extending lengthwise of the body between the inside and outside thereof.

The mass ratio of non-straight, short fibers to rubber in the rubber layer may be in the range of from 4:100 to 35:100.

The non-straight, short fibers may be randomly oriented in the rubber layer.

The rubber layer may be directly exposed at one of the inside and outside of the body.

The invention is further directed to a method of forming a power transmission belt. The method includes the steps of: forming a rubber layer by embedding non-straight, short fibers in a rubber defining the rubber layer so that the mass ratio of non-straight short fibers to rubber in the rubber layer is in the range of 4:100 to 35:100; and joining the rubber layer to at least one other component to define a power transmission belt with a body having a length, an inside, an outside and laterally spaced sides.

The step of forming a rubber layer may involve rolling the rubber in which the non-straight, short fibers are embedded into a sheet form.

The step of forming a rubber layer may involve embedding ultra-short fibers having a length of 0.1 mm to 1.0 mm in the rubber defining the rubber layer.

The step of joining the rubber layer to at least one other component may involve joining the rubber layer to at least one other component to define a body wherein the rubber layer is exposed at one of the inside and outside of the body.

The method may further include the step of forming a plurality of ribs extending lengthwise of the body at the other of the inside and outside of the body.

In one form, the step of joining the rubber layer to at least one other component involves joining the rubber layer to at least one load carrying member extending lengthwise of the body so that the at least one load carrying member resides between the inside and outside of the body.

DETAILED DESCRIPTION OF THE DRAWINGS

Figure 1:
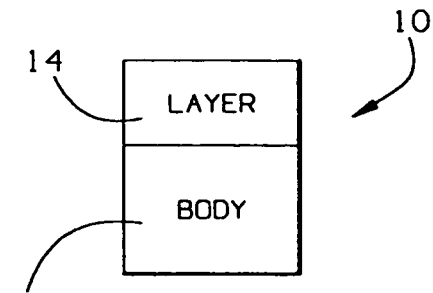
FIG. 1 is a schematic representation of a power transmission belt, made according to the present invention.

Referring initially to FIG. 1, a power transmission belt, according to the present invention, is shown schematically at 10, to encompass a belt construction having a body 12 with an exposed layer 14 having a composition, as hereinafter described. The particular construction and composition of the belt is not critical to the present invention.

Figure 2:
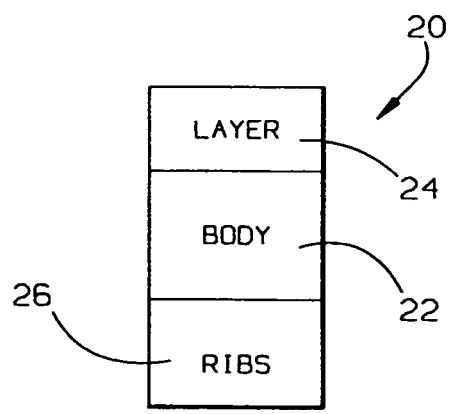
FIG. 2 is a schematic representation of a V-ribbed belt, made according to the present invention.

The invention is particularly suitable for incorporation into a V-ribbed power transmission belt, as shown schematically at 20 in FIG. 2. Again, the schematic showing is intended to demonstrate that the inventive concept can be used with any type of V-ribbed power transmission belt, regardless of its particular shape, composition, or arrangement of components. The V-ribbed belt 20 has a body 22 with an exposed layer 24, as hereinafter described, on one side of the body 22, with a plurality of ribs 26 formed on the opposite side of the body 22.

To demonstrate the inventive concept, three exemplary, and more specific forms of V-ribbed belt, will now be described with respect to FIGS. 3-5, with the V-ribbed power transmission belts identified therein as 30, 30', 30", respectively.

Figure 3:
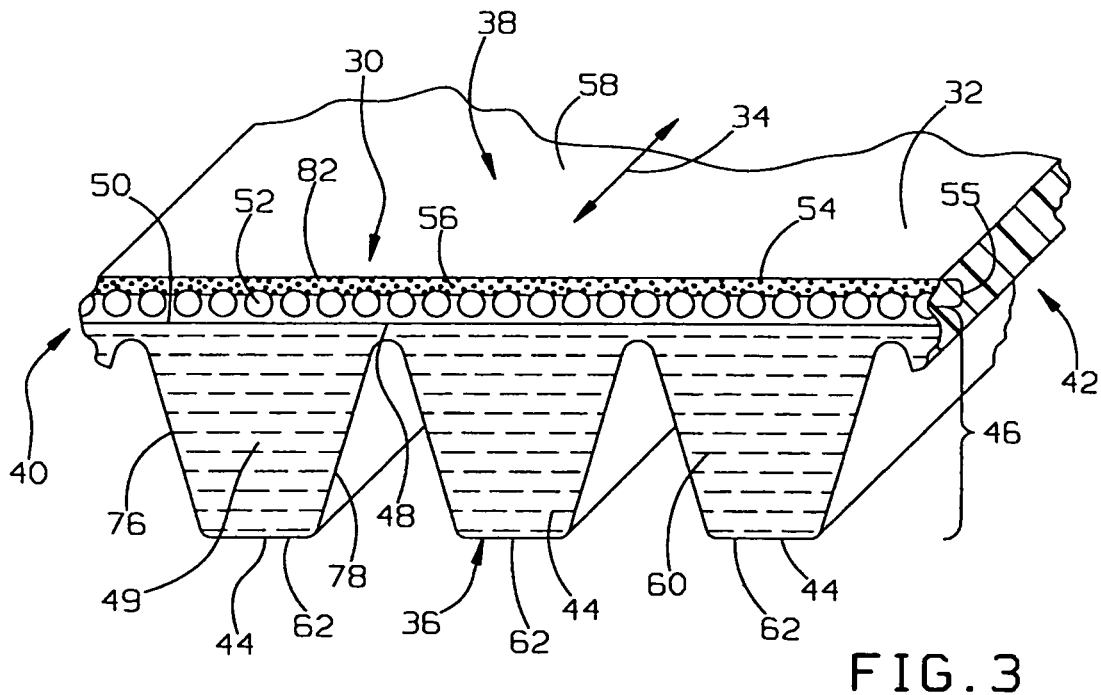
FIG. 3 is a fragmentary, cross-sectional, perspective view of a V-ribbed belt, made according to the present invention.

The V-ribbed belt 30 has a body 32 with a length extending in the direction of the double-headed arrow 34, an inside 36, an outside 38, and laterally spaced sides, shown generally at 40, 42 in FIG. 3, with the sides cut off from a potential full width contemplated by the invention. A plurality of laterally spaced ribs 44 extends continuously around the length of the belt body 32. As few as two such ribs 44 are contemplated, with as many as a number exceeding the three shown in FIG. 3 likewise contemplated.

The ribs 44 are defined in a compression section 46 that is defined by one or more rubber layers. A cushion rubber layer 48, defining a part of the compression section 46, is applied to an outside surface 50 of one compression section layer 49 and has embedded therein at least one load carrying member 52. In this case, the at least one load carrying member 52 consists of one, or a plurality of, spirally wrapped, load carrying cords, embedded in the cushion rubber layer 48.

The rubber layer 54, defining in conjunction with a part of the cushion rubber layer 48 the tension section 55 of the belt 30, is applied to the outside of the cushion rubber layer 48 and load carrying cords 52. The rubber layer 54 has short fibers 56 embedded therein having a composition and shape as hereinafter described. The rubber layer 54 defines an exposed back surface 58 on the power transmission belt 30.

The ribs 44 are generally trapezoidal in shape in cross section, taken transversely to the length thereof. However, as noted above, the precise shape is not critical to the present invention. In the ribs 44, short fibers 60 are embedded. The lengths of the short fibers 60 are aligned generally to extend from side-to-side within the ribs 44. The rib surfaces at 62 are polished.

Figure 4:
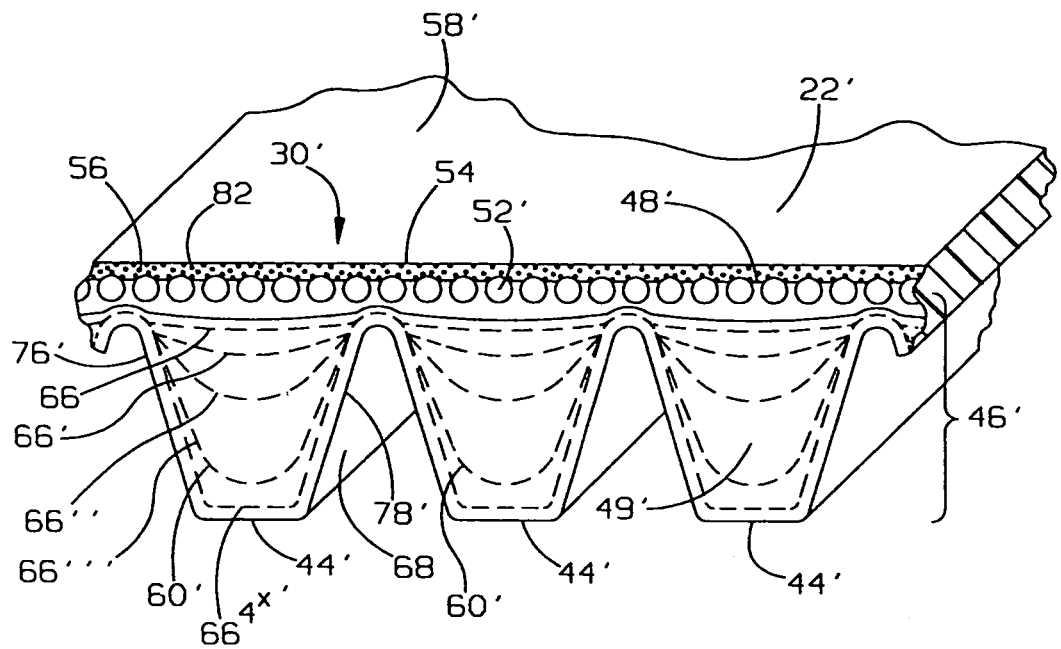
FIG. 4 is a view as in FIG. 3 of a modified form of the V-ribbed belt, made according to the present invention.

The V-ribbed belt 30' in FIG. 4 has the same general arrangement of components as does the V-ribbed belt 30 in FIG. 3. The belt 30' has a body 22' defined by the aforementioned rubber layer 54, and a corresponding compression section 46', defined by one or more rubber layers 49', and part of a cushion rubber layer 48' in which load carrying cords 52' are embedded. The rubber layer 54 has the aforementioned fibers 56 embedded therein and defines an exposed back surface 58'. Correspondingly shaped ribs 44' are defined in the compression section 46'.

Short fibers 60' are embedded in the compression section 46' and are oriented in a number of layers 66, 66', 66", 66'", $66^{4x'}$. The layers 66, 66', 66", 66'" are curved and nominally follow the shape of the associated ribs 44'. The innermost layer $66^{4x'}$ more closely follows the shape of the ribs 44' at the exposed surface 68 of the compression section 46'.

Figure 5:
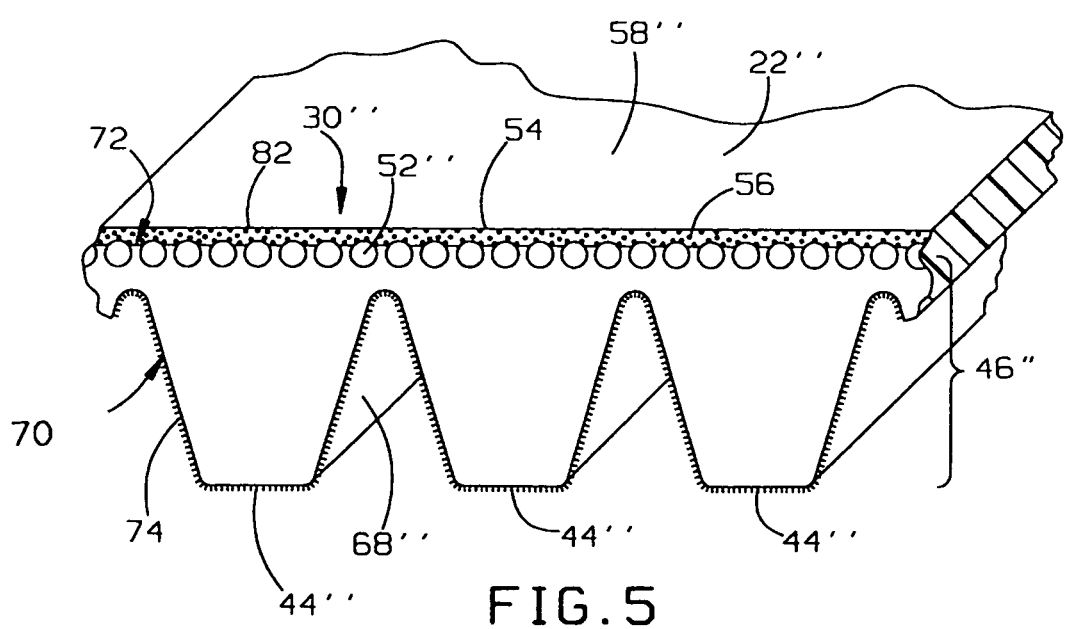
FIG. 5 is a view as in FIGS. 3 and 4 of a still further modified form of V-ribbed belt made according to the present invention.

The power transmission belt 30" in FIG. 5 incorporates the rubber layer 54 with the fibers 56 embedded therein. The body 22" is defined by the rubber layer 54, as well as a layer 70 that defines the compression section 46" and has a portion at 72 that performs the function of the aforementioned cushion rubber layers 48, 48', in which load carrying cords 52" are embedded. The rubber layer 54 defines the exposed back surface 58" on the belt 30". In this embodiment, the layer 70 contains no short reinforcing fibers.

Ribs 44" are formed in the layer 70, with the shape as previously described. Short fibers 74 are implanted in the exposed surface 68" on the ribs 44" in the compression section 46".

In all of the belts 30, 30', 30", the fibers 56 in the rubber layer 54 are randomly oriented, as explained in greater detail hereinbelow.

In each of the above embodiments, the load carrying cords 52, 52', 52" are shown embedded within adjacent layers. However, this is not a requirement. As an alternative, a discrete cushion rubber layer may be provided between the rubber layer 54 and a layer on the compression section.

Use of short fibers, to be implanted in and/or fully embedded within the rubber of the ribs, is not required. Implanted and/or embedded fibers may be used, one without the other, together, or altogether eliminated.

In each embodiment, the compression sections may be made from a single layer or multiple layers. In the event that there are multiple layers, and reinforcing short fibers are utilized, it is preferred that fibers be embedded in only the innermost layer. These fibers are preferably oriented so that their lengths extend from side-to-side as in FIG. 3, or in a pattern nominally conforming to the rib shape, as shown in FIG. 4. The innermost layer of fibers may conform more closely to the rib shape than do the fibers in the other layers.

As far as implanting the fibers 74, any method known to those skilled in the art may be utilized. Mechanical and electrostatic implanting techniques are well known to those in this industry.

The rubber layer 54 is preferably made from a composition, as hereinafter described. To effectively suppress noise, as when the back surface 58 is in contact with an idler pulley, the fibers 56 are embedded so as to produce an exposed asperity pattern on the back surface 58. This pattern may be made possible by using a knitted fabric pattern, a woven fabric pattern, a cord woven fabric pattern, etc. Of these, the woven fabric pattern is preferred. The back surface 58 may be polished.

With the belt construction shown in FIG. 5, it is preferred that the rubber in the layer 70, in the vicinity of the load carrying cords 52", not have short fibers embedded therein so as to maximize adhesion between the rubber therein and the load carrying cords 52".

Likewise, in the belts 30, 30', it is preferred that the cushion rubber layers 48, 48' not have reinforcing fibers therein, as might compromise adhesion between the rubber therein and the load carrying cords 52, 52'.

The layer(s) 49, 49' in FIGS. 3 and 4, respectively, layer(s) 70 in FIG. 5, cushion rubber layers 48, 48', and the layer 54 are preferably each made from a rubber composition. Suitable rubber components for this composition may be at least one of an ethylene/α-olefin rubber, butadiene rubber (BR), styrene-butadiene rubber (SBR), nitrile-butadiene rubber (NBR), hydrogenated nitrile-butadiene rubber (H-NBR), chloroprene rubber (CR), isobutylene-isoprene rubber (IIR), natural rubber (NR), ethylene-vinyl ester copolymer, and ethylene-α,β-unsaturated carboxylate copolymer. Of these, an ethylene/α-olefin rubber is preferred because it is a relatively cheap polymer having excellent resistance to ozone, heat, and cold. It also meets a demand that no halogens be used. That is, for a rubber component, an ethylene/α-olefin rubber is preferably used alone or blended with one or more other kinds of rubbers. The rubber component in the layer 54 preferably contains an ethylene/α-olefin rubber as a "main component", i.e. one constituting a large percentage of the rubber material. For example, a rubber which accounts for 50% or more in a composition is referred to as a "main component".

An ethylene/α-olefin rubber is a copolymer of ethylene and an α-olefin (propylene, butene, hexene, octene, or the like) or a copolymer of ethylene, the α-olefin, and a nonconjugated diene. Specific examples include rubbers such as an ethylene-propylene copolymer (EPM), ethylene-butene copolymer (EBM), and ethylene-propylene-diene copolymer (EPDM). An example of the diene component includes a nonconjugated diene having 5 to 15 carbon atoms such as ethylidene norbornene, dicyclopentadiene, 1,4-hexadiene, cyclooctadiene, or methylene norbornene.

An EPDM has excellent heat and cold resisting properties, which can be exploited in the resulting belt. EPDM's with an iodine value of 3-40 are preferred. If the iodine value is less than 3, there may be insufficient vulcanization of a rubber composition. This may cause abrasion or sticking to occur. An iodine value in excess of 40 may result in a short scorch time for the rubber composition. This may make the rubber composition difficult to handle. The heat resistance thereof may also be diminished.

The main, ethylene/α-olefin component of the rubber in the layer 54 preferably contains an ethylene-propylene-diene copolymer and an ethylene-butene copolymer. The inclusion of an ethylene-propylene-diene copolymer and an ethylene-butene copolymer, as ethylene/α-olefin, makes the moldability of the composition excellent, while improving the anti-tearing and anti-cracking properties thereof. The ethylene/α-olefin in the layer 54 preferably contains an ethylene-propylene-diene copolymer and an ethylene-butene copolymer such that the mass ratio of the ethylene-propylene-diene copolymer to the ethylene-butene copolymer is within a range of from 90:10 to 30:80. The anti-tearing and anti-cracking properties can be improved by making the mass ratio of an ethylene-propylene-diene copolymer in a composition lower than the mass ratio between an ethylene-propylene-diene copolymer and an ethylene-butene copolymer of 90:10. When the mass ratio of an ethylene-propylene-diene copolymer is made to be larger than the mass ratio between an ethylene-propylene-diene copolymer and an ethylene-butene copolymer of 30:80, excellent processability is achieved, thus reducing the likelihood of molding defects.

To improve the adhesive strength or anti-tearing properties, the rubber composition may contain an ethylene-vinyl ester copolymer and/or ethylene-α,β-unsaturated carboxylate copolymer and an ethylene/α-olefin rubber in a mass ratio of 5/95 to 95/5, and more preferably 10/90 to 60/40.

The rubber component in each of the aforementioned layers may be the same, as described above, or different. That is, for exemplary belt 30, the rubber composition of the layer(s) 49 in the compression section 46 and the cushion rubber layer 48 and rubber layer 54 may all be the same or different. As an alternative, some, but not all, of the layers may have the same rubber composition.

Sulfur or organic peroxides are preferably used to cross-link the rubber. Examples of the organic peroxide include di-t-butyl peroxide, dicumyl peroxide, t-butylcumyl peroxide, 1,1-t-butylperoxy-3,3,5-trimethyl cyclohexane, 2,5-di-methyl-2,5-di(t-butylperoxy)hexane, 2,5-di-methyl-2,5-di(t-butylperoxy)hexane-3, bis(t-butylperoxy-di-isopropyl) benzene, 2,5-di-methyl-2,5-di(benzoyl-peroxy)hexane, t-butylperoxy benzoate, and t-butylperoxy-2-ethyl-hexyl carbonate. These organic peroxides may be used independently or two or more may be combined in a mixture in which the organic peroxides are formulated in a ratio of from 0.5 to 8 by mass with respect to 100 by mass of rubber.

The rubber composition may be made using a vulcanization accelerator. Examples of suitable vulcanization accelerators include thiazole-based, thiuram-based, and sulfenamide-based vulcanization accelerators. Specific examples of the thiazole-based vulcanization accelerator include 2-mercapto-benzothiazole, 2-mercaptothiazoline, dibenzothiazole disulfide, and a zinc salt of 2-mercaptobenzothiazole. Specific examples of the thiuram-based vulcanization accelerator include tetramethylthiuram monosulfide, tetramethylthiuram disulfide, tetraethylthiuram disulfide, and N,N'-dimethyl-N,N'-diphenylthiuram disulfide. Specific examples of the sulfenamide-based vulcanization accelerator include N-cyclohexyl-2-benzothiazyl sulfenamide and N,N'-cyclohexyl-2-benzothiazyl sulfenamide. In addition, other vulcanization accelerators such as bismaleimide and ethylene thiourea can be used. Any one of the vulcanization accelerators may be used independently or in combination.

A crosslinking co-agent can be used to increase the degree of crosslinking to thereby reduce sticking and abrasion. Preferred examples of the crosslinking co-agent include TAIC, TAC, 1,2-polybutadiene, a metal salt of unsaturated carboxylic acid, oximes, guanidine, trimethylolpropane trimethacrylate, ethylene glycol dimethacrylate, and N—N'-m-phenylenebismaleimide. The crosslinking co-agent is preferably used in a range of from 0.5 to 10 by mass ratio with respect to 100 by mass ratio of a rubber. A mass ratio of less than 0.5 may not produce a significant effect, whereas a mass ratio exceeding 10 is apt to decrease tearing strength and adhesive strength.

In addition to the above-described agents, agents as normally used in rubber compositions may be included, among which are a reinforcement such as carbon black or silica, a filler such as calcium carbonate or talc, a plasticizer, a stabilizer, a processing co-agent, and a colorant.

The reinforcing fibers 60, 60' in the belts 30, 30' may be one, or a mixture, of nylon 6, nylon 66, polyester, cotton, aramid, etc. By mixing these fibers in the compression sections 46, 46', the lateral compressive resistance of the layer(s) in the compression sections 46, 46' may be increased. By causing the fibers 60, 60' to protrude at the rib side surfaces 76, 78, 76', 78' on the ribs 44, 44', respectively, the coefficient of friction between these surfaces and a cooperating pulley can be reduced, as a consequence of which noise generated during running of the belts 30, 30' can be likewise reduced.

Preferably, the fibers 60, 60' have a length of 1-20 mm. They are preferably mixed in mass ratio with respect to the rubber ranging from 1:100 to 55:100. When the mixing ratio of the fibers 60, 60' is less than 1, there is a tendency of the rubber at the surfaces 76, 78, 76', 78' to adhere to cooperating pulley surfaces and wear excessively. If the mass ratio exceeds 55, the fibers 60, 60' may not be uniformly dispersed within the rubber.

To enhance adhesion between the fibers 60, 60' and the rubber, it is preferred that the fibers 60, 60' be subjected to an adhesion treatment, as by using a processing liquid containing an epoxy compound, an isocyanate compound, etc.

The fibers 56 in the rubber layer 54 are pre-formed with a predetermined non-straight shape i.e., with bent portions. The fibers 56 are placed in the rubber in the layer 54 in a random orientation. Preferably, each fiber 56 has one or more bends. Representative, non-straight/bent shapes are shown in FIGS. 6-10.

Figure 6:
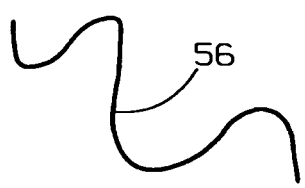
FIGS. 6-10 show different configurations for non-straight/bent fibers in an exposed layer on the belts in FIGS. 1-5.
Figure 9:
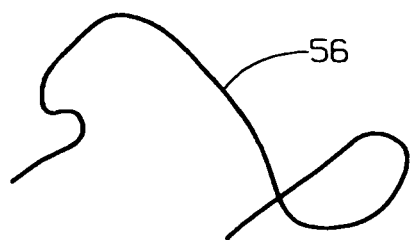
Figure 7:
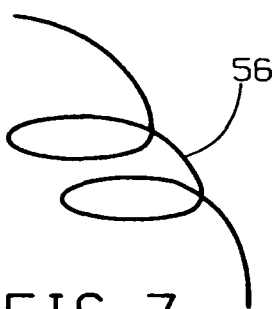
Figure 8:
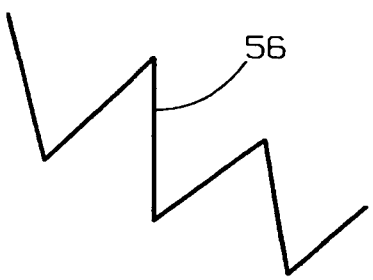
Figure 10:
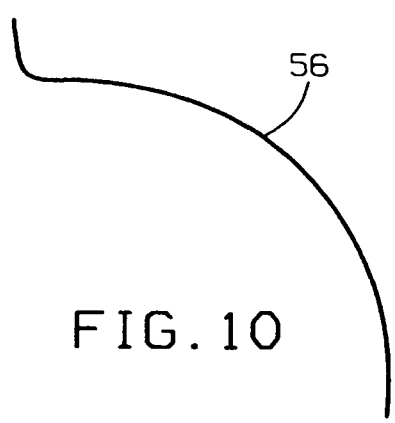

FIG. 6 shows an undulating configuration. FIG. 7 shows a spiral configuration. FIG. 8 shows a zig-zag configuration. FIG. 9 shows a random/amorphous configuration. FIG. 10 shows a gently curved/bent configuration.

The rubber in the layer 54 may contain fibers 56 having only one non-straight/bent configuration. Alternatively, the various configurations shown in FIGS. 6-10 may be mixed in any combination. Shapes additional to those shown are also contemplated, so long as portions of the length of each fiber 56 extend in different directions so as to effect reinforcement in more than one directions. Thus, resistance to tearing and cracking in a number of directions is achieved, which may account for a longer belt life.

If the fibers 56 are excessively bent, or there are an excessive number of bent portions, it may be difficult to disperse the fibers 56 in the rubber. Thus, bending is controlled to the extent that the dispersion of the fibers 56 is not adversely affected.

One preferred form of the invention utilizes milled fibers 56. Milled fibers are short fibers obtained by pulverizing chopped strands, as by a mill, or the like. It is possible to form short fibers 56 with appropriately bent portions by reason of loading during pulverization.

The invention also contemplates that the non-straight/bent fibers 56 be mixed with fibers that are straight.

The fibers 56 may be ones made from polyamide (nylon short fibers, etc.). The fibers 56 preferably have a length in the range of 0.1 to 3.0 mm. By using short polyamide fibers, excellent wear resistance may be achieved.

It is preferred that the fibers 56 be mixed in the rubber in the layer 54 in a mass ratio of from 4:100 to 35:100. When the short fibers 56 are present in mass ratio amount less than 4, there may not be an appreciable improvement in terms of tear resistance and crack resistance. With mass ratio exceeding 35, the fibers 56 may be difficult to disperse uniformly in the rubber. Additionally, the bendability of the belt within which the rubber layer 54 is incorporated may deteriorate detrimentally.

The fibers 56 may also be subjected to adhesion treatment, the same as, or similar to, that previously described for the fibers 60, 60'.

The load carrying members/cords 52, 52', 52" may take a wide range of different forms. In one form, a twisted cord is used made of polyester fiber, polymethylene terephthalate fiber, polybutylene terephthalate fiber, glass fiber, or aramid fiber. The composition of the glass fiber may be E-glass or S-glass (high-strength glass) and is not limited by the diameter of the filaments, the number of filaments being combined, or the number of strands.

The load carrying cords 52, 52', 52" are preferably subjected to an adhesion treatment. As one example, the load carrying cords 52, 52', 52" can be made as a stretched, treated cord produced by: 1) impregnating an untreated cord by dipping the same in a tank filled with a treating solution selected from epoxy compounds and isocyanate compounds; 2) drying the resulting cord in a furnace set at a temperature of from 160° C. to 200° C. from 30 to 600 seconds; 3) impregnating the dried cord by dipping the same in a tank filled with an RFL adhesion solution; and 4) placing the resulting cord in a stretching, thermo-fixing machine set at a temperature of from 210° C. to 260° C. for 30 to 600 seconds, to stretch the resultant cord by −1% to 3%.

Examples of suitable isocyanate compounds for pretreatment solution are 4,4'-diphenylmethane diisocyanate, tolylene-2,4-diisocyanate, polymethylene polyphenyl polyisocyanate, hexamethylene diisocyanate, and polyaryl polyisocyanate. The isocyanate compounds may be used in combination with an organic solvent such as toluene or methyl ethyl ketone. A blocked polyisocyanate in which isocyanate groups in the polyisocyanate are blocked by subjecting such isocyanate compounds to a reaction with a blocking agent such as phenols, tertiary alcohols, or secondary alcohols, can also be used.

Examples of the epoxy compound are a reaction product, a polyhydric alcohol such as ethylene glycol, glycerin, pentaerythritol, or polyalkylene glycol such as polyethylene glycol with a halogen-containing epoxy compound such as epichlorohydrin; and a reaction product of polyhydric alcohols such as resorcin, bis(4-hydroxyphenyl)dimethylethane, a phenol-formaldehyde resin, and resorcin-formaldehyde resin and a halogen-containing epoxy compound. Such epoxy compounds are used in combination with an organic solvent such as toluene or methyl ethyl ketone.

An RFL treating solution is a mixture of an initial condensation product of resorcin and formaldehyde with a latex rubber, in which a molar ratio of resorcin and formaldehyde is preferably 1:2 to 2:1 to improve adhesive strength. A molar ratio of less than 1:2 causes a resorcin-formaldehyde resin to gelate by promoting crosslinking reaction. A molar ratio exceeding 2:1 does not promote the reaction between resorcin and formaldehyde well, as a result of which the adhesive strength decreases. A ternary copolymer of styrene/butadiene/vinylpyridine, a hydrogenated nitrile rubber, a chloroprene rubber, nitrile rubber, or the like can be used as a latex rubber.

A solid mass ratio of an initial condensation product of resorcin-formaldehyde to the latex rubber is preferably 1:2 to 1:8, within which range adhesive strength may be adequately increased. When the solid mass ratio exceeds 1:2, the amount of resin components in resorcin-formaldehyde increases. The obtained RFL film hardens and its dynamic adhesive strength deteriorates. On the other hand, when the solid mass ratio is less than 1:8, the amount of the resin component in resorcin-formaldehyde decreases and the obtained RFL film softens. As a result, adhesive strength decreases.

A vulcanization accelerator and a vulcanizing agent may be used with the RFL solution. A sulfur-containing vulcanization accelerator can be used. Specific examples thereof which can be used include: 2-mercaptobenzothiazol (M) and salts thereof (for example, a zinc salt, sodium salt, and cyclohexylamine salt); thiazoles such as dibenzothiazyl disulfide (DM); sulfenamides such as N-cyclohexyl-2-benzothiazyl sulfenamide (CZ); thiurams such as tetramethylthiuram monosulfide (TS), tetramethylthiuram disulfide (TT), and dipentamethylenethiuram tetrasulfide (TRA); and dithiocarbamates such as sodium di-n-butyidithiocarbamate (TP), zinc dimethyl dithiocarbamate (PZ), and zinc diethyldimethyl dithiocarbamate (EZ). In addition, sulfur, a metal oxide (zinc oxide, magnesium oxide, or lead oxide), a peroxide, and the like may be included as vulcanizing agents and each of them can be used in combination with the above-described vulcanization accelerator.

For each of the load carrying cords 52, 52', 52", it is desirable that the tensile force for expanding the belt by 2% be from 100 N/rib to 250 N/rib and more preferably 130 from N/rib to 210 N/rib. Within this range, even when belt elongation occurs due to rib rubber wear, an abrupt reduction in tensile force will not result and thus the tensile force can be stably maintained. When the tensile force exceeds 250 N/rib, an abrupt reduction in tensile force may be observed, with belt elongation. When the tensile force is less than 100 N/rib, significant reduction in belt tension may result due to the elongation of the load carrying cords.

With an initial load of 147 N per 5 cords applied to the belt for 30 minutes in a 100° C. atmosphere, the resultant belt contraction is preferably in the range of 50 to 150 N per 5 cords. The belt tension then allows auto adjustment, even if belt elongation occurs, making it possible to have a low slip rate and adequate service length without requiring an automatic tensioner. When the contraction force under a dry heating condition is less than 50 N, the belt tension adjustment performance may be relatively poor, as a result of which the slip rate increases. When the contraction force of the belt under dry heating conditions exceeds 150 N, the contraction of the belt length tends to progress with time, and the reduction of the slip rate is relatively low.

A first method of manufacturing a V-ribbed belt, as shown in FIGS. 2-5, will now be described. It should be understood that the particular methods described are exemplary in nature only. Those skilled in the art are familiar with many other ways to manufacture such a belt.

A rubber layer 54, in sheet form, and a cushion rubber layer are wrapped around the peripheral surface of a cylindrical shaping drum. Load carrying cords are then spirally wrapped therearound. One or more compression rubber layers are in turn wrapped around the components on the cylindrical shaping drum to produce an unvulcanized sleeve, which can thereafter be vulcanized.

The vulcanized sleeve is trained around driving and driven rollers and placed under a predetermined tension. A rotating grinding wheel is strategically abutted to the driven sleeve to simultaneously form a plurality (3 to 100) grooves, thereby forming rib portions on the compression section of the sleeve. The formed sleeve is then separated from the rollers and trained around driving and driven rollers. The sleeve is cut to predetermined widths by a cutter to produce the individual belts.

A second method of manufacturing a V-rib belt is as follows. A compression rubber section, consisting of one or more layers, and a cushion rubber layer, each in sheet form, are wrapped around a cylindrical drum having a ribbed peripheral surface. A load carrying cord is spirally wound therearound after which the rubber layer 54 is wrapped to define an unvulcanized sleeve. Vulcanization is carried out with the sleeve against the drum, thereby forming ribs in the compression section by forming the sleeve against the sleeve against the complementary shape of the drum. The rib surfaces are polished as necessary, after which the sleeve is cut to predetermined widths to produce individual V-ribbed belts.

In a third manufacturing method, the rubber layer 54 and the cushion rubber layer, each in sheet form, are wrapped around a flexible jacket attached to a cylindrical shaping drum. A load carrying cord is spirally wrapped therearound. A compression section, in the form of one or more sheet layers, is thereafter wrapped to produce an unvulcanized sleeve. The flexible jacket is expanded, with the unvulcanized sleeve thereby pressed against an external die having a surface configured complementarily to the desired end rib shape. Vulcanization and shaping of the sleeve are thus carried out. The rib surfaces are then polished, as necessary, and the sleeve thereafter cut to predetermined widths to produce individual V-ribbed belts.

In a fourth manufacturing method, a compression section, consisting of one or more layers in sheet form, is wrapped around a flexible jacket attached to a cylindrical drum to define a first unvulcanized sleeve. The flexible jacket is expanded to force the unvulcanized sleeve against an external die with a shape complementary to the desired end rib shape. This produces a body with rib portions. The drum is then separated from the external die that is in close contact with the shaped body. The rubber layer 54 and the cushion rubber layer are then wrapped around the drum, followed by a spirally wrapped load carrying cord to produce a second unvulcanized sleeve. The flexible jacket is expanded and a second unvulcanized sleeve is pressed from the inner peripheral side against the external die held in close contact with the shaped body, whereupon vulcanization is carried out. The resulting sleeve has ribs formed thereon. The rib surfaces are polished as needed and the sleeve cut at predetermined widths to produce individual V-ribbed belts.

If the compression section consists of two layers, it is necessary to form an unvulcanized sleeve by either wrapping the compression section as one piece, or by successively wrapping the layers. With the first manufacturing method described above, the ribs can be formed by grinding and the inside layer located on the crests of the ribs of the resulting belts, and the outside layer exposed at the rib side surfaces and at the rib bottoms. Thus, with this type of construction for the compression section, it is preferred to not use the first described method. However, methods two through four can be used.

The belt 30" in FIG. 5 can be made without the requirement of a cushion rubber layer for carrying out the processes described above.

The belt 30' in FIG. 4, with the fibers 60' arranged as shown therein, can be made using any of the second, third, or fourth processes, described above.

The belt 30 in FIG. 3, with the fibers 60, as shown therein oriented laterally, can be made preferably using the first method.

Regardless of the method utilized, the rubber layer 54 is formed as a sheet in a separate step, with the non-straight/bent fibers 56 embedded in rubber therein in the aforementioned mass ratio of from 4:100 to 35:100. Preferably, the sheet is formed by rolling a rubber composition in which the fibers 56 are dispersed.

In the prior art, straight short fibers are generally oriented in the rolling direction as the rubber sheet is formed. With the non-straight/bent fibers 56, a rubber composition in which the fibers 56 are dispersed can be rolled so that the fibers 56 are not oriented in the rolling direction, thereby allowing a random distribution of the fibers 56.

Specific examples of V-ribbed belts, made according to the present invention, will now be described. Rubber compositions were prepared according to the mass mixing ratios in Table 1, reproduced below.

TABLE 1

|  | Inventive Example | | | Comparative Example | | | |
|---|---|---|---|---|---|---|---|
|  | 1 | 2 | 3 | 1 | 2 | 3 | 4 |
| EPDM | 100 | 100 | 100 | 100 | 100 | 100 | 100 |
| Nylon milled-fiber | 10 | 5 | 30 | 3 | 40 | — | — |
| Nylon cut-fiber | — | — | — | — | — | 10 | 10 |
| Stearic acid | 1 | 1 | 1 | 1 | 1 | 1 | 1 |
| Zinc oxide | 5 | 5 | 5 | 5 | 5 | 5 | 5 |
| FEF carbon black | 60 | 60 | 50 | 60 | 50 | 60 | 60 |
| Paraffinic oil | 8 | 6 | 8 | 6 | 10 | 8 | 8 |
| Anti-aging agent | 2 | 2 | 2 | 2 | 2 | 2 | 2 |
| Co-crosslinking agent | 2 | 2 | 2 | 2 | 2 | 2 | 2 |
| Organic peroxide | 8 | 8 | 8 | 8 | 8 | 8 | 8 |
| Sulfur | 0.3 | 0.3 | 0.3 | 0.3 | 0.3 | 0.3 | 0.3 |

The rubber compositions were rolled into rubber sheets with a thickness of 1.0 mm by a calendar roll. The rubber sheets were vulcanized for 30 minutes at 165° C. The physical properties of the vulcanized rubbers obtained thereby were measured. Hardness (JIS-A) was measured according to JIS K6253. Elongation EB (%) at the time of breaking was measured according to JIS K6251. Stress TB (MPa) at the time of breaking was measured according to JIS K6251. Tearing force (TR-A: N/mm) was measured according to JIS K6252. The measurements are shown in Table 2, below.

TABLE 2

|  | Inventive Example | | | Comparative Example | | | |
|---|---|---|---|---|---|---|---|
|  | 1 | 2 | 3 | 1 | 2 | 3 | 4 |
| Nylon milled-fiber | 10 | 5 | 30 | 3 | 40 | — | — |
| Nylon cut-fiber | — | — | — | — | — | 10 | 10 |
| Orientation of short fibers | Random | Random | Random | Random | Random | Longitudinal Direction | Width Direction |
| Hardness (JIS-A) | 83 | 83 | 84 | 83 | 84 | 84 | 84 |
| MD TB (MPa) | 16.1 | 18.1 | 11.8 | 12.6 | 10.1 | 14.5 | 14.5 |
| MD EB (%) | 228 | 240 | 186 | 243 | 112 | 186 | 186 |
| MD TR-A (N/mm) | 45.7 | 40.8 | 68.3 | 38.6 | 57.8 | 45.4 | 45.5 |
| CMD TR-A (N/mm) | 38.7 | 36.8 | 39.3 | 35.7 | 36.7 | 35 | 35 |
| Heat resistance driving test Running time (h) | 400 | 400 | 400 | 400 | 248 | 400 | 400 |
| State of belt | Terminated | Terminated | Terminated | Life time | Life time | Terminated | Life time |
| Crack (rib rubber) | None | None | None | None | None | None | None |
| Crack (rib rubber) | None | None | None | Occurrence | Rubber fracture | None | Occurrence |
| Step pulley longitudinal split test State of belt | No aberration | No aberration | No aberration | Longitudinal split | No aberration | Longitudinal split | No aberration |

In Tables 1 and 2, Inventive Examples and Comparative Examples are shown. In Table 1, the EPDM contains 60 wt. % of ethylene and ethylidene norbornene as a diene component. The nylon milled-fiber was a mixture of fibers each having the form shown in FIGS. 6-10 herein, with a fiber length of 2 mm. The nylon cut-fiber had a straight form with a length of 3 mm. A rubber composition having Diana processing oil manufactured by Idemitsu Kosan Co., Ltd. as a paraffinic oil, N—N-m-phenylene dimaleimide as a co-crosslinking agent, an organic peroxide made up of 40% wt of 1,3-bis(t-butylperoxyisopropyl)benzene and 60 wt % of calcium carbonate was used.

In Table 2, MD indicates a direction parallel to a direction which fibers are oriented, with CMD indicating a direction perpendicular to a direction which fibers are oriented. In Inventive Examples 1-3 and Comparative Examples 1 and 2, a direction parallel to a rolling direction is referred to as MD and a direction perpendicular to the rolling direction is referred to as CMD.

In the Examples, orientation of the short fibers in the rubber sheets was observed. A rubber sheet using a nylon cut fiber showed an orientation parallel to a rolling direction, while a rubber sheet using a nylon milled fiber showed a random orientation (see Table 2).

In this embodiment, a V-ribbed belt was manufactured in which the load carrying cord was made from polyester fiber ropes embedded in a cushion rubber layer. The outside layer was arranged thereon. A compression layer having ribs extending in a longitudinal direction was arranged inside the cushion rubber layer. In manufacturing this V-ribbed belt, the outside layer was initially wrapped around a flat cylindrical mold, followed by wrapping of the cushion rubber layer/sheet and the load carrying cord. After wrapping a layer defining the compression section, a vulcanizing jacket was fitted thereover. The shaping mold was put in a vulcanization can and, after vulcanization, the sleeve was separated from the mold. The compression section was shaped by a grinder to produce ribs. The resulting sleeve was cut at predetermine intervals to produce V-ribbed belts of desired width.

For the compression rubber sheet/layer, a rubber composition was kneaded by a Banbury mixer with composition using a mixing ratio as shown in Table 1, above. This composition was then rolled by a calendar roll. The cushion rubber sheet/layer was obtained by kneading a rubber composition, as set forth in Table 1, in a Banbury mixer without short fibers. The composition was then rolled using a calendar roll. The outside rubber layer was prepared by kneading a rubber composition with a mixing ratio as set forth in Table 1 in a Banbury mixer. The composition was then rolled using a calendar roll.

Table 2 also shows the results of a heat resistance driving/bendability running test and a step pulley longitudinal split running test conducted on the above-described belts. In the running test machine used in the heat resistance bendability running test, the following pulleys were utilized: a driving pulley with a 60 mm diameter; a first idler pulley having a 50 mm diameter; a driven pulley having a 50 mm diameter; a tension pulley with a 50 mm diameter; and a second idler pulley with a 50 mm diameter. A V-ribbed belt was trained around each pulley of the running test machine, that was configured so that the mounting angle of the V-ribbed belt with respect to one idler pulley was 90°. The driving pulley of the test machine was rotated at 3300 rpm in a 130° C. environment, with a belt tension of 800 N/rib adjusted by a load on the driving pulley. The test was concluded in 400 hours, with an investigation undertaken thereafter with respect to the belt life and the cause of failure.

The step pulley longitudinal split running test was conducted by using a running test machine with a sequential arrangement of: a driving pulley with a 120 mm diameter; a driven pulley with a 120 mm diameter; and a tension pulley with a 45 mm diameter. Each pulley had ribs and recesses complementary to the ribs on the belt. A central protrusion had a uniform diameter higher by 0.75 mm. The V-ribbed belt was mounted around the running test machine, which was configured so that the mounting angle of the V-ribbed belt with respect to the tension pulley was 90°. The driving pulley was rotated at 4900 rpm in a 23° C. environment. The belt tension was 1497 N/rib, adjusted by a load on the driving pulley and driven pulley of 12PS. The test was concluded in 400 hours. The belts were thereafter analyzed to determine whether longitudinal splits were generated.

As seen in Table 2, the Comparative Examples 3 and 4, in which straight, short fibers (nylon cut-fibers) were mixed, had the short fibers oriented in one direction on the rubber sheet after rolling. In Comparative Example 3, with the short fibers oriented in a longitudinal direction of the belt, there was no problem as far as the heat resistance running test was concerned. However, as can be seen from the results of the stepped pulley longitudinal split running test, there was a problem with respect to the resistance to longitudinal splitting. In Comparative Example 4, in which the short fibers were oriented in the belt width direction, a crack in the belt width direction was observed during the heat resistance running test. Further, in a belt in which short fibers (nylon milled-fibers) with bent portions of various configurations, such as undulating form, were randomly oriented, generation of a crack from an end surface was observed, for example, in Comparative Example 1, in which the mixing amount was less than the preferred 4% amount. On the other hand, in Comparative Example 2, in which the mixing amount exceeded the desired amount (in excess of 35%), the rubber elasticity was too high, and rubber fracture was caused during the heat resistance running test.

With respect to Inventive Examples 1-3, in which the appropriate amount of short fibers having bent portions of various configurations, such as those with undulating forms, were randomly oriented, it was confirmed that the belts were superior in terms of both longitudinal split resistance and crack resistance.

A test was carried out using a rubber composition containing as ethylene/α-olefin, an ethylene-propylene-diene copolymer and ethylene-butene copolymer, to confirm the effects of variation in the mass ratio formulation of an ethylene-propylene-diene copolymer (EPDM) and ethylene-butene copolymer (EBM). More specifically, using a rubber sheet made from the rubber composition having the mass ratio formulation for Inventive Examples 4-6 in Table 3, below, analysis corresponding to that for Inventive Examples 1-3 above was performed.

TABLE 3

|  | Inventive Example | | |
| --- | --- | --- | --- |
|  | 4 | 5 | 6 |
| EPDM | 70 | 40 | 80 |
| EBM* | 30 | 60 | 20 |
| Nylon milled-fiber | 10 | 10 | 20 |
| Nylon cut-fiber | — | — | — |
| Stearic acid | 1 | 1 | 1 |
| Zinc oxide | 5 | 5 | 5 |
| FEF Carbon Black | 60 | 60 | 60 |
| Paraffinic oil | 8 | 8 | 8 |
| Anti-aging agent | 2 | 2 | 2 |
| Co-crosslinking agent | 2 | 2 | 2 |
| Organic peroxide | 8 | 8 | 8 |
| Sulfur | 0.3 | 0.3 | 0.3 |

*contains 25-35 wt. % butene

Additionally, a test similar to that for Inventive Examples 1-3, described above, was carried out for a V-ribbed belt manufactured using the rubber sheet. Table 4 shows the results of this testing and analysis.

TABLE 4

|  | Inventive Example | | |
| --- | --- | --- | --- |
|  | 4 | 5 | 6 |
| Nylon milled-fiber | 10 | 10 | 20 |
| Nylon cut-fiber | — | — | — |
| Orientation of short fibers | Random | Random | Random |
| Hardness (JIS-A) | /85 | 87 | 86 |
| MD TB (MPa) | 17.5 | 18.2 | 12.9 |
| MD EB (%) | 220 | 201 | 189 |
| MD TR-A (N/mm) | 52.8 | 48.8 | 60.3 |
| CMD TR-A (N/mm) | 41.2 | 39.6 | 37.5 |
| Heat resistance running test/Running time (h) | 400 | 400 | 400 |
| State of belt | Terminated | Terminated | Terminated |
| Crack (rib rubber) | None | None | None |
| Crack (back rubber) | None | None | None |
| Step pulley longitudinal split test/State of belt | No aberration | No aberration | No aberration |

Inventive Examples 4-6 each demonstrated excellent processability. Moldability was good. As seen from Tables 3 and 4, the combined use of EPDM and EBM increased (MD TR-A) and (CMD TR-A) and resulted in improving anti-tearing and anti-cracking properties. Thus, when a ratio of the mass of the ethylene-propylene-diene copolymer exceeds a mass ratio of the ethylene-propylene-diene copolymer to the ethylene-butene copolymer, of 90:10, the improvement in the anti-tearing and anti-cracking properties is less significant. When a ratio of the mass of the ethylene-propylene-diene copolymer is lower than the mass ratio of the ethylene-propylene-diene copolymer to the ethylene-butene copolymer, of 30:80, molding defects are apt to occur because good productivity is not achieved.

In the V-ribbed belt of this embodiment, the exposed outside layer was not made from canvas but rather of a rubber composition so that there was no significant noise generation attributable to canvas. The exposed outside layer was formed of a rubber composition with short fibers to suppress noise generation, such as slip sound, due to generation of adhesive wear on the belt back surface. Further, since the short fibers in the layer had bent portions, they were easily placed in a random orientation state in which there is no single directional orientation that results. Thus, resistance to forces applied in multiple directions is achieved. Thus, it is possible to suppress both generation of a longitudinal split in the trough portions between the ribs and generation of cracks from a belt end portion. By improving tear and crack resistance, a longer belt life may be achieved.

With the inventive belt, it is possible to suppress generation of noise when the belt back surface is brought into contact, as with an idler pulley, and to reduce the likelihood of longitudinal split and crack generation at the belt end portion.

Additionally, with this embodiment, it is possible to conveniently produce the short fibers with bent portions by using milled fibers formed by pulverization, or the like. Milled fibers are bendable to an appropriate degree whereby they can be satisfactorily dispersed in the rubber composition without localized unevenness in fiber distribution. Thus, crack resistance and tear resistance can be markedly improved, contributing to an adequately long belt life.

With the exposed outside layer containing polyamide short fibers, even when the back surface is driven, as with the back surface held in contact with an idler pulley, adequate wear resistance may result.

In the event that straight short fibers are used, random orientation of these fibers to achieve the same dual purpose of longitudinal split and crack resistance becomes difficult. On the other hand, if a rubber composition with straight fibers is rolled, the short fibers will be oriented in a fixed direction, making it difficult to secure random orientation for these fibers. Consequently, manufacturing may not be economically practical. On the other hand, by mixing the bent fibers, this random orientation can be achieved solely by mixing the same in rubber. Random orientation can be realized without a dominant orientation direction.

The V-ribbed belts 30, 30', 30'' can be modified by embedding ultra-short fibers 82 in addition to the fibers 56 in the rubber layer 54. These fibers 82 have lengths in the range of 0.1 mm to 1.0 mm. Preferably, the fibers 82 are also randomly oriented within the rubber layer 54.

The fibers 82 are difficult to prepare with a length of less than 0.1 mm. With the fiber lengths exceeding 1.0 mm, the fibers are likely to be oriented in a fixed direction in the rubber layer 54, which may adversely affect the desired properties of the belt.

The ultra-short fibers 82 may be made, for example, from cellulose fibers. As an example of natural cellulose-type fibers, cotton may be used. For synthetic cellulose-type fibers, viscose rayon and cupro-ammonium rayon may be used.

With the fibers 82 having a length within this range, even if the rubber layer 54 is formed using a rubber sheet formed by rolling a rubber composition, the fibers 82 do not tend to orient in a rolling direction. Thus, the addition of the fibers 82 does not complicate the process for producing the rubber layer 54 with the desired characteristics.

By including the non-straight/bent fibers 56 and the ultra-short fibers 82, it is possible to impart various desired characteristics to the rubber layer 54. As one example, when nylon is used for the fibers 56, and cellulose for the fibers 82, it is possible to obtain excellent wear resistance as well as to achieve an improvement in hydrophilic nature, i.e. to achieve improvement in the transmission capabilities with the belt exposed to water.

Specific examples of the above type of V-ribbed belt will now be described. Rubber compositions were prepared using the mass mixing ratios in Table 5, below.

TABLE 5

| | Inventive Example | |
| --- | --- | --- |
| | 7 | 8 |
| EPDM | 100 | 100 |
| Nylon milled-fiber (2 mm) | 15 | 10 |
| Ultra-short cotton fiber (0.5 mm) | — | 10 |
| Stearic acid | 1 | 1 |
| Zinc oxide | 5 | 5 |
| FEF Carbon Black | 60 | 60 |
| Paraffinic oil | 8 | 8 |
| Anti-aging agent | 2 | 2 |
| Co-crosslinking agent | 2 | 2 |
| Organic peroxide | 8 | 8 |
| Sulfur | 0.3 | 0.3 |

The rubber compositions were rolled using a calendar roll to produce sheets that were vulcanized. The physical properties of the vulcanized rubbers were measured. The measurements were preformed corresponding to those show in Table 2. The results of the measurements are shown in Table 6, below.

TABLE 6

| | Inventive Example | |
| --- | --- | --- |
| | 7 | 8 |
| Nylon milled-fiber (2 mm) | — | 10 |
| Ultra-short cotton fiber (0.5 mm) | 15 | 10 |
| Orientation of short fibers | Random | Random |
| Hardness (JIS-A) | 84 | 84 |
| MD TB (MPa) | 14.8 | 15.9 |
| MD EB (%) | 204 | 190 |
| MD TR-A (N/mm) | 43.2 | 58.8 |
| CMD TR-A (N/mm) | 36.9 | 37.7 |
| Heat resistance running test Running time (h) | 400 | 400 |
| State of belt | Terminated | Terminated |
| Crack (rib rubber) | None | None |
| Crack (back rubber) | None | None |
| Step pulley longitudinal split test / State of belt | No aberration | No aberration |

For Inventive Example 7, shown in Tables 5 and 6, the exposed outside layer had short, non-straight/bent nylon milled fibers, but no ultra-short fibers. In Inventive Example 8, shown in Tables 5 and 6, in addition to the non-straight/bent fibers, ultra-short cotton fibers, with a length of 0.5 mm, were used.

As shown in Table 6, the orientation of the short fibers in the rubber sheets Inventive Examples 7 and 8 was observed. In Example 7, the nylon milled fibers were in a random orientation as in the Example in Table 2. It was confirmed that in Example 8, both the nylon milled fibers and the ultra-short cotton fibers were randomly oriented.

Table 6 also shows the results of a heat resistance bendability running test and a step pulley longitudinal split running test conducted on V-ribbed belts obtained, as described above. The test was conducted in the same manner as shown for the Examples of Table 2. As shown in Table 6, it was confirmed that for Inventive Example 7, both longitudinal split resistance and crack resistance were satisfactory. It was confirmed that with Inventive Example 8, which contains ultra short cotton fibers, the belt was superior in both longitudinal split and crack resistance.

Further, as an additional test, a 2% slip test and a coefficient of friction measurement test were conducted for Inventive Examples 7 and 8. Table 7 shows the test results. The 2% slip test is a test for evaluating the transmission performance of the belt, and was conducted on a 3PK1100 type belt (number of ribs: 3; belt length: 1100 mm).

Inventive Examples 7 and 8 were trained around a driving pulley and a driven pulley, each with a 120 mm diameter. A load was imparted to the driving pulley so that the belt tension with respect to the three ribs was 150 N. The driving pulley was operated at 2000 rpm, with a load on the driven pulley increased from zero to measure the torque when a 2% slip occurred. In the 2% slip test, which is a transmission performance test, the transmission performance with the belt dry and in the presence of water (dripped at a rate of 300 ml/min.), was evaluated.

Figure 11:
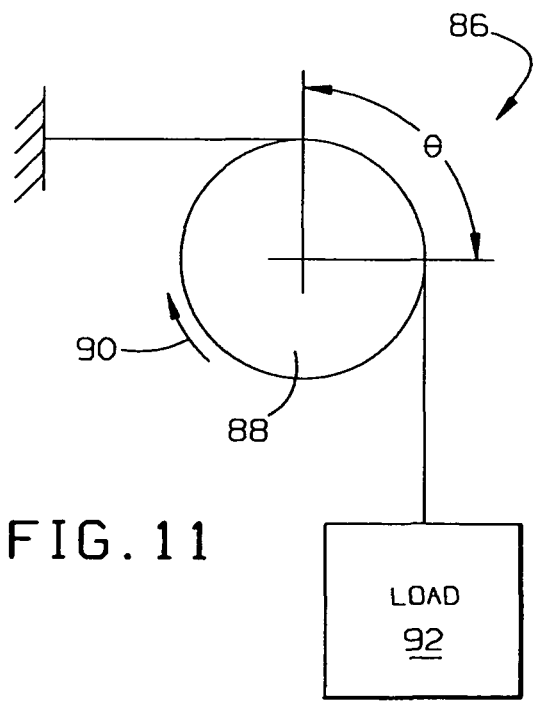
FIG. 11 is a schematic representation of a test system for measuring a coefficient of friction between belts and a cooperating surface.

To conduct the coefficient of friction measurement test, the V-ribbed belts of Inventive Examples 7 and 8, (type 6PK1100), were mounted on a system as shown at 86 in FIG. 11. A drive pulley 88 was driven at a speed of 43 rpm in the direction of the arrow 90. A load 92 of 1.75 kgf was applied through an angle θ equal to 90°. The coefficient of friction with the belt in the dry state was first measured. Thereafter the coefficient of friction was measured while pouring water on the belt. While recording the coefficient of friction in a time series, the maximum coefficient of friction was checked and noise evaluation based on auditory sense was carried out.

The coefficient of friction abruptly decreased immediately after the water was applied, increasing as the water dried up, and ultimately reaching a fixed value. During drying, after the water was poured, the coefficient of friction increased abruptly. The higher the maximum coefficient of friction for the belt, the more readily noise generation occurred.

As shown in Table 7 below, in contrast to the Inventive Example 7, which contained only short non-straight/bent fibers with no ultra-short fibers, in Inventive Example 8, both shortfibers having non-straight/bent shaped and ultra-short-fibers were present.

TABLE 7

|  | Inventive Example | |
| --- | --- | --- |
|  | 7 | 8 |
| Nylon milled-fiber (2 mm) | 15 | 10 |
| Ultra-short cotton fiber (0.5 mm) | — | 10 |
| Orientation of short fibers | Random | Random |
| Driven torque at 2% slip (kgf/1 rib) | | |
| Belt dried state | 0.81 | 0.88 |
| Water pouring state | 0.31 | 0.52 |

TABLE 7-continued

|  | Inventive Example | |
| --- | --- | --- |
|  | 7 | 8 |
| Coefficient of friction | | |
| Belt dried state | 1.1 | 1.4 |
| Water pouring state | 0.4 | 1.0 |

It was confirmed that both the measured torque obtained by the 2% slip test while water was being poured and coefficient of friction increased. This confirms that, due to the ultra-short cotton fibers present in the random orientation, the coefficient of friction increased as water was being applied. Consequently, slippage did not readily occur. As a result, the belt exhibited little difference in transmission performance capabilities between states in which it was dry and in which water was applied. In both Inventive Examples 7 and 8, generation of noise, as from sound due to slippage, was suppressed.

As earlier described, with the V-ribbed belt having an exposed back surface including ultra-short fibers, having a length of 0.1 mm to 1.0 mm, random orientation of these fibers can be easily effected. The combination of non-straight/bent fibers and the ultra-short fibers accounted for positive resistance to applied forces from multiple directions. Thus, it is possible to reduce the likelihood of generation of longitudinal splitting in the trough portions between adjacent ribs and cracking at the back end portions. By affording improved tear and crack resistance, an adequate belt life can be achieved.

The particular use to which the belt is put is not critical to the present invention. As examples, the V-ribbed belt may be used in the automotive industry or for general industrial apparatus. The invention can be used and practiced with V-ribbed belts and other belts in virtually any environment.

By reason of not requiring the use of a canvas for the rubber layer 54, the problem of noise generation associated with canvas, and particularly canvas with a splice, is obviated.

Additionally, by not using a canvas layer, the coefficient of friction between the back surface and a coopering pulley may be increased, potentially allowing a great power transmission capability.

The foregoing disclosure of specific embodiments is intended to be illustrative of the broad concepts comprehended by the invention.

The invention claimed is:

1. A power transmission belt comprising:
a body having a length, an inside, an outside, laterally spaced sides, and a plurality of ribs extending lengthwise at one of the inside and outside of the body,
the body comprising a rubber layer at the other of the inside and outside of the body in which short fibers are embedded,
the short fibers pre-formed to a predetermined, non-straight shape before being added to rubber in the rubber layer so that the embedded short fibers reinforce the rubber in the rubber layer in multiple directions,
the predetermined, non-straight shape being the same for the short fibers.

2. The power transmission belt according to claim 1 wherein the body further comprises at least one load carrying member extending lengthwise of the body between the inside and outside of the body.

3. The power transmission belt according to claim 1 wherein the mass ratio of non-straight, short fibers to rubber in the rubber layer is in a range of from 4:100 to 35:100.

4. The power transmission belt according to claim 2 wherein the mass ratio of non-straight, short fibers to rubber in the rubber layer is in a range of from 4:100 to 35:100.

5. The power transmission belt according to claim 4 wherein the non-straight, short fibers are randomly oriented in the rubber layer.

6. The power transmission belt according to claim 5 wherein the non-straight, short fibers comprise milled fibers.

7. The power transmission belt according to claim 3 wherein the non-straight, short fibers comprise polyamide.

8. The power transmission belt according to claim 6 wherein the non-straight, short fibers comprise polyamide.

9. The power transmission belt according to claim 3 wherein the rubber in the rubber layer comprises ethylene/α-olefin as a main component.

10. The power transmission belt according to claim 8 wherein the rubber in the rubber layer comprises ethylene/α-olefin as a main component.

11. The power transmission belt according to claim 9 wherein the ethylene/α-olefin comprises an ethylene-propylene-diene copolymer and an ethylene-butene copolymer.

12. The power transmission belt according to claim 10 wherein the ethylene/α-olefin comprises an ethylene-propylene-diene copolymer and an ethylene-butene copolymer.

13. The power transmission belt according to claim 11 wherein the mass ratio of the ethylene-propylene-diene copolymer to ethylene-butene copolymer is in a range of from 90:10 to 30:80.

14. The power transmission belt according to claim 12 wherein the mass ratio of the ethylene-propylene-diene copolymer to ethylene-butene copolymer is in a range of from 90:10 to 30:80.

15. The power transmission belt according to claim 1 wherein the rubber layer further comprises a plurality of ultra-short fibers having a length in a range of from 0.1 mm to 1.0 mm.

16. The power transmission belt according to claim 13 wherein the rubber layer further comprises a plurality of ultra-short fibers having a length in a range of from 0.1 mm to 1.0 mm.

17. The power transmission belt according to claim 14 wherein the rubber layer further comprises a plurality of ultra-short fibers having a length in a range of from 0.1 mm to 1.0 mm.

18. The power transmission belt according to claim 15 wherein the ultra-short fibers comprise a cellulose.

19. The power transmission belt according to claim 16 wherein the ultra-short fibers comprise a cellulose.

20. The power transmission belt according to claim 17 wherein the ultra-short fibers comprise a cellulose.

21. The power transmission belt according to claim 1 wherein the rubber layer is directly exposed at the other of the inside and outside of the body.

22. The power transmission belt according to claim 18 wherein the rubber layer is directly exposed at the other of the inside and outside of the body.

23. The power transmission belt according to claim 19 wherein the rubber layer is directly exposed at the other of the inside and outside of the body.

24. The power transmission belt according to claim 20 wherein the rubber layer is directly exposed at the other of the inside and outside of the body.

25. The power transmission belt according to claim 1 wherein the power transmission belt has a compression section and a tension section and the plurality of ribs is defined in the compression section and the rubber layer is defined in the tension section.

26. The power transmission belt according to claim 1 wherein the non-straight short fibers have a length of 0.1 to 3.0 mm.

27. The power transmission belt according to claim 3 wherein the non-straight short fibers have a length of 0.1 to 3.0 mm.

28. A power transmission belt comprising:
a body having a length, an inside, an outside and laterally spaced sides,
the body comprising a rubber layer at one of the inside and outside of the body in which short fibers are embedded,
the short fibers pre-formed to a predetermined, non-straight shape before being added to rubber in the rubber layer so that portions of each of the short fibers that is embedded project in different directions within the rubber layer so that each of the short fibers reinforces the rubber in the rubber layer in multiple directions,
the predetermined, non-straight shape being the same for the short fibers.

29. The power transmission belt according to claim 28 wherein the body further comprises at least one load carrying member extending lengthwise of the body between the inside and outside of the body.

30. The power transmission belt according to claim 29 wherein the mass ratio of non-straight, short fibers to rubber in the rubber layer is in a range of from 4:100 to 35:100.

31. The power transmission belt according to claim 30 wherein the non-straight, short fibers are randomly oriented in the rubber layer.

32. The power transmission belt according to claim 31 wherein the rubber layer further comprises a plurality of ultra-short fibers having a length in a range of from 0.1 mm to 1.0 mm.

33. The power transmission belt according to claim 31 wherein the rubber layer is directly exposed at one of the inside and outside of the body.

34. The power transmission belt according to claim 31 wherein the non-straight short fibers have a length of 0.1 to 3.0 mm.

35. A method of forming a power transmission belt, the method comprising the steps of:
bending short fibers to a predetermined, non-straight shape,
the predetermined, non-straight shape being the same for the short fibers;
after bending the short fibers, forming a rubber layer by embedding the non-straight, short fibers in a rubber defining the rubber layer so that the mass ratio of non-straight short fibers to rubber in the rubber layer is in a range of 4:100 to 35:100 and so that portions on each of the short fibers that are embedded project in different directions so that each of the embedded short fibers reinforce the rubber in the rubber layer in multiple directions; and
joining the rubber layer to at least one other component to define a power transmission belt with a body having a length, an inside, an outside and laterally spaced sides.

36. The method of forming a power transmission belt according to claim 35 wherein the step of forming a rubber layer comprises rolling the rubber in which the non-straight, short fibers are embedded into a sheet form.

37. The method of forming a power transmission belt according to claim 35 wherein the step of forming a rubber layer comprises embedding ultra-short fibers having a length of 0.1 mm to 1.0 mm in the rubber defining the rubber layer.

38. The method of forming a power transmission belt according to claim 36 wherein the step of forming a rubber layer comprises embedding ultra-short fibers having a length of 0.1 mm to 1.0 mm in the rubber defining the rubber layer.

39. The method of forming a power transmission belt according to claim 35 wherein the step of joining the rubber layer to at least one other component comprises joining the rubber layer to at least one other component to define a body wherein the rubber layer is exposed at one of the inside and outside of the body.

40. The method of forming a power transmission belt according to claim 39 further comprising the step of forming a plurality of ribs extending lengthwise of the body at the other of the inside and outside of the body.

41. The method of forming a power transmission belt according to claim 35 wherein the step of joining the rubber layer to at least one other component comprises joining the rubber layer to at least one load carrying member extending lengthwise of the body so that the at least one load carrying member resides between the inside and outside of the body.

42. The power transmission belt according to claim 1 wherein the predetermined, non-straight shape is an undulating configuration.

43. The power transmission belt according to claim 28 wherein the predetermined, non-straight shape is an undulating configuration.

44. The method of forming a power transmission belt according to claim 35 wherein the predetermined, non-straight shape is an undulating configuration.

45. A power transmission belt comprising:
a body having a length, an inside, an outside, laterally spaced sides, and a plurality of ribs extending lengthwise at one of the inside and outside of the body,
the body comprising a rubber layer at the other of the inside and outside of the body in which short fibers are embedded,
the short fibers pre-formed to a predetermined, non-straight shape before being added to rubber in the rubber layer so that the embedded short fibers reinforce the rubber in the rubber layer in multiple directions,
the short fibers having a length of 0.1 to 3.0 mm,
the predetermined, non-straight shape being the same for the short fibers,
wherein the predetermined, non-straight shape is an undulating configuration.

46. The power transmission belt according to claim 45 wherein the rubber layer further comprises a plurality of ultra-short fibers having a length in a range of from 0.1 mm to 1.0 mm.

47. A power transmission belt comprising:
a body having a length, an inside, an outside, laterally spaced sides, and a plurality of ribs extending lengthwise at one of the inside and outside of the body,
the body comprising a rubber layer at the other of the inside and outside of the body in which short fibers are embedded,
the short fibers pre-formed to a predetermined, non-straight shape before being added to rubber in the rubber layer so that the embedded short fibers reinforce the rubber in the rubber layer in multiple directions,
wherein the rubber layer further comprises a plurality of ultra-short fibers having a length of from 0.1 mm to 1.0 mm.

* * * * *